Aug. 16, 1927. 1,638,943

G. M. LITTLE

THERMOELECTRIC CELL AND METHOD OF MAKING THE SAME

Filed Sept. 27, 1922

WITNESSES:
R. J. Butler.

INVENTOR
George M. Little.
BY
ATTORNEY

Patented Aug. 16, 1927.

1,638,943

UNITED STATES PATENT OFFICE.

GEORGE M. LITTLE, OF PITTSBURGH, PENNSYLVANIA, ASSIGNOR TO WESTINGHOUSE ELECTRIC & MANUFACTURING COMPANY, A CORPORATION OF PENNSYLVANIA.

THERMOELECTRIC CELL AND METHOD OF MAKING THE SAME.

Application filed September 27, 1922. Serial No. 590,754.

This invention relates to primary cells, more especially to cells deriving their potential from the thermo-electric effect produced at the junction of two metals and to a method of making cells of this type, it being among the objects of my invention to provide an improved cell of this type.

More particularly, my invention resides in a cell of this character embodying a suitable number of plates having any desired number of junctions of two different metals thereon. One set of said junctions is heated by suitable means, generally by a resistor element of nichrome wire placed in proximity to one of the edges of the assembled stack of plates. The other edges of the assembled plates are exposed to the atmosphere and they constitute the cool junctions of the cell. To adjust the voltage of the cell, a rheostat is placed in the heating circuit whereby the temperature of the hot junctions may be readily varied.

A cell of this type is especially suitable for use in radio receiving sets, as the "B" battery thereof. It is desirable, in such application, to have a cell which is compact, has a fairly constant voltage which may be varied within a small range at will and does not necessarily deliver a large current. I have found that my cell is especially suitable for this use since it may be inserted in the ordinary house lighting circuit to provide the heating effect, and the voltage of the "B" battery may be readily adjusted by the rheostat.

In the accompanying drawings constituting a part hereof and in which like reference characters indicate like parts, Fig. 1 is an end view of a cell made in accordance with my invention;

Figure 1:
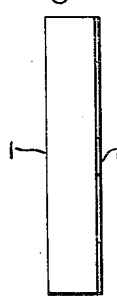
Figure 2:
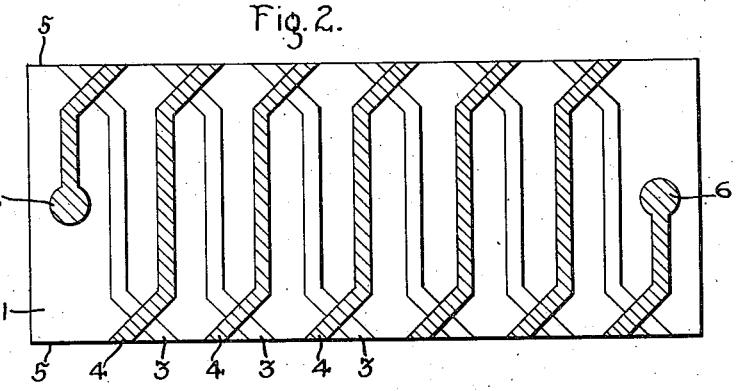
Fig. 2 is a side view thereof.

I provide a base 1, generally in the form of a flat plate of insulating material, such as asbestos, upon the surface 2 of which is provided a series of strips of metal of different kinds having junctions at suitable points. To provide such a structure, I first cover the surface 2 with a sheet of material having openings corresponding to strips 3 and then spray on the asbestos plate a suitable metal, such as copper or the like, after which the pattern is removed and another pattern corresponding to strips 4 of a different metal, such as zinc, placed thereon. The second metal is then sprayed on. Any suitable method, such as the Schoop metal-spraying process, may be utilized for spraying the metals. Terminals 6 are provided by spraying a suitable portion along the ends of the plate.

There is thus produced a thermo-electric element consisting of a series of junctions along the top and bottom edges 5 of the insulating plate 1. A suitable number of such plates are assembled on edge in a container having a nichrome resistance element in the bottom thereof, the upper edges of said plates being exposed to the atmosphere.

Figure 3:
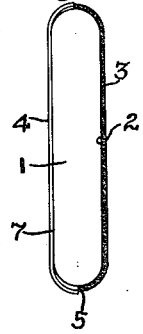
Figs. 3 and 4 are end and side views, respectively, of a modification of my invention.
Figure 4:
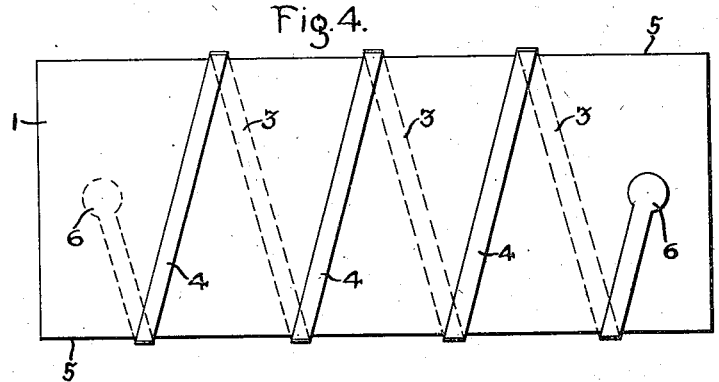

A similar structure may be obtained by a different method. An insulating plate 1, Figs. 3 and 4, is wound spirally with a wide strip of suitable protective material leaving relatively narrow spaces between convolutions. A metal 3 is then sprayed on side 2 of the insulating plate 1 and a different metal 4 sprayed on side 7 thereof. The two metals are caused to overlap at the edges 5 of the plate. The strip of protective material is then removed.

Figure 5:
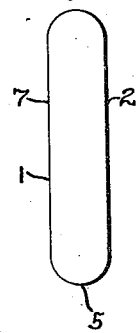
Figs. 5 and 6 are similar views of a still further modification thereof.
Figure 6:
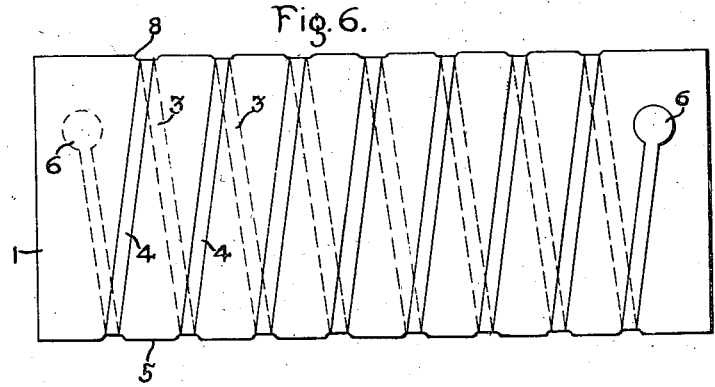

A still further modification of my invention is shown in Figs. 5 and 6. I provide an insulating plate 1 having a spiral groove 8 therein. A metal 3 is then sprayed on side 2 and metal 4 on side 7, as described above. The two metals overlap along the edges 5 of the plate. The surfaces of the plate are then ground down to remove the metal outside of the grooves 8, thereby providing a structure which embodies relatively narrow strips of material having junctions at the top and bottom edges of the plate.

Cells of this type are comparatively inexpensive to produce and are efficient in operation. They are compact and are capable of indefinite use. They do not deteriorate upon standing. This is of considerable importance in radio "B" batteries wherein the cells are used intermittently and hitherto the usefulness of the cell has been greatly decreased by continual deterioration caused by standing.

Although I have described several embodiments of my invention, it is to be understood that said embodiments do not constitute limitations thereupon but that other modifications thereof may be made within the scope of my invention. For instance, I may coat the plate with an oily or similar material prior to spraying the metal thereon, thereby causing the sprayed metal to adhere only to those portions not covered with said material. Although I have mentioned asbestos as the preferable material for the base, other materials of insulating nature may be substituted therefor. The metals which I prefer to use are, of course, only examples of the metals which are available, and the description of the use of such metals in my cell is considered as illustrative and not limiting.

I claim as my invention:

1. A thermoelectric cell comprising an insulating base, continuous strips of a plurality of metals integral therewith, said strips making overlapping contact members at the edges of said base.

2. A thermoelectric cell comprising an insulating base, continuous strips of a plurality of metals integral therewith, said strips crossing each other and forming overlapping contact members at the edges of said base.

3. A thermoelectric cell comprising a flat insulating base, strips of a plurality of metals on the sides thereof, said strips forming overlapping contact members at the edges of said base.

4. A thermoelectric cell comprising an insulating base, strips of a plurality of metals on a plurality of sides thereof, one of said metals being on one side and another on another side, said strips being overlapped at the ends thereof and forming contact members at the edges of said base.

5. A thermoelectric cell comprising a flat insulating base, a continuous strip of two metals on the sides thereof, one of said metals being on one side and the other on the opposite side, said strips being joined end to end forming contact members at the edges of said base.

6. A thermoelectric cell comprising an insulating base and continuous strips of a plurality of metals placed thereon in such manner as to form contact members at the edges of said base, said contact members being laminated structures of overlapping layers of said metals.

7. A thermoelectric cell comprising an insulating base, a continuous composite strip of a plurality of metals formed thereon, one metal being on one side and another metal on another side of said base, and contact members between said metals at the edges of said base, said members comprising a laminated structure of overlapping layers of said metals.

8. A thermoelectric cell comprising an insulating base, a continuous composite strip of a plurality of metals formed thereon, one metal being on one side and another metal on another side of said base, and contact members between said metals at the edges of said base, said members comprising overlapping layers of said metals.

9. A method of making thermoelectric cells having an insulating base which comprises spraying strips of different metals thereon so that said metals make contact at a plurality of points.

10. A method of making thermoelectric cells having an insulating base which comprises spraying strips of different metals thereon so that said metals make contact at a plurality of points along the edges of said base.

11. A method of making thermoelectric cells having an insulating base which comprises spraying strips of different metals on the sides of said base so that said metals make contact at a plurality of points along the edges of said base.

12. A method of making thermoelectric cells having an insulating base which comprises spraying strips of one metal on each side of said base so that said metal makes contact at a plurality of points along the edges of said base.

In testimony whereof, I have hereunto subscribed my name this 21st day of September, 1922.

GEORGE M. LITTLE.